United States Patent [19]

Greci et al.

[11] Patent Number: 4,536,244
[45] Date of Patent: Aug. 20, 1985

[54] METHODS AND APPARATUS FOR LOCKING THE FACING EDGES OF CARPET BACKINGS DIRECTLY TOGETHER AT THE SEAM DURING A FACE SEAMING OPERATION WITH A HOT MELT ADHESIVE TAPE

[75] Inventors: John J. Greci, Livermore; Merle C. Hoopengardner, Lafayette, both of Calif.

[73] Assignee: Orcon Corporation, Union City, Calif.

[21] Appl. No.: 626,658

[22] Filed: Jul. 2, 1984

[51] Int. Cl.³ .............. B31F 5/06; B65H 69/02; D06F 75/08
[52] U.S. Cl. .............. 156/304.4; 156/304.6; 156/309.6; 156/500; 156/505; 156/574; 156/579; 219/245
[58] Field of Search .............. 156/157, 304.1, 304.3, 156/304.4, 304.6, 304.7, 309.6, 499, 500, 502, 505, 574, 579; 219/243, 245; 264/284, 293, 323

[56] References Cited

U.S. PATENT DOCUMENTS

| | | | |
|---|---|---|---|
| 3,523,176 | 8/1970 | Hill | 156/579 |
| 3,533,876 | 10/1970 | Burgess | 156/304.4 |
| 3,927,298 | 12/1975 | Prater | 219/245 |

FOREIGN PATENT DOCUMENTS 619991  5/1961  Canada .............. 156/304

Primary Examiner—Michael Wityshyn
Attorney, Agent, or Firm—Donald C. Feix

[57] ABSTRACT

A carpet seaming iron of the kind used for making face seams with hot melt adhesive tapes forms a raised center bead in the molten adhesive produced behind the iron. The center bead is of a sufficient height and stiffness to coat the side edges of the carpet backings with hot melt adhesive as the undersides of the carpet backings are lowered onto the layer of molten adhesive. The side edges of the backings are locked directly together through the adhesive interposed between the side edges.

26 Claims, 13 Drawing Figures

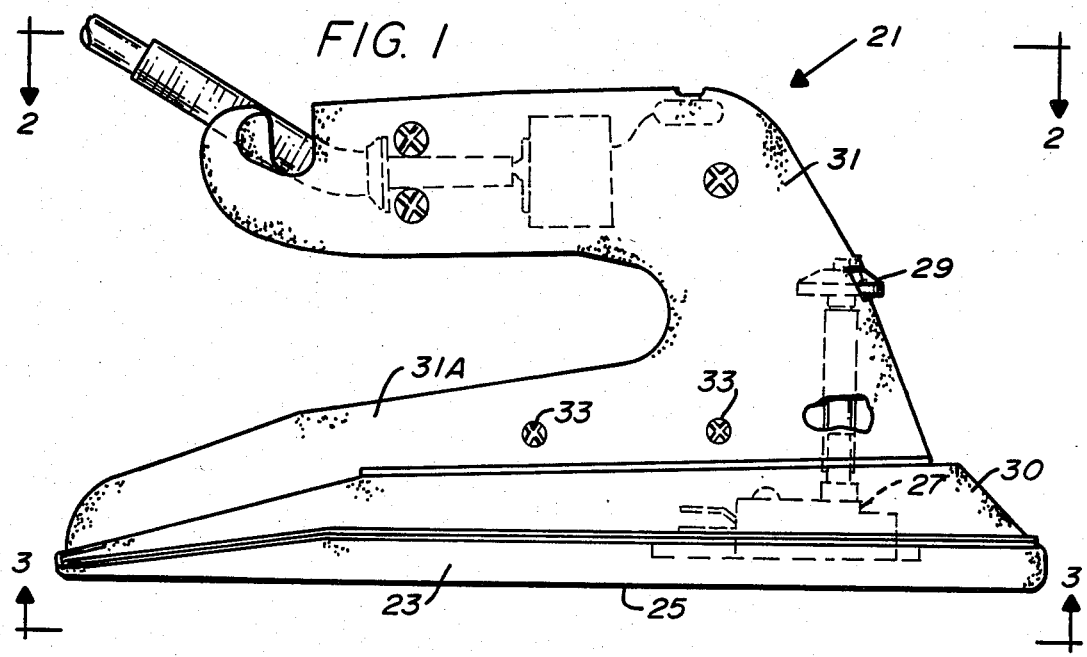
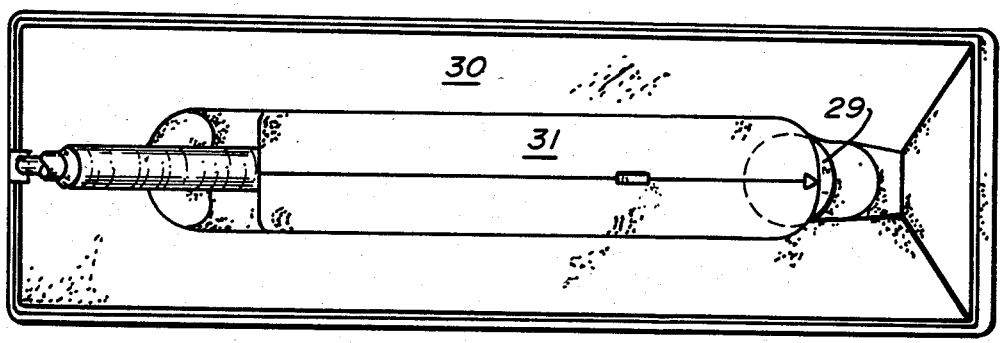
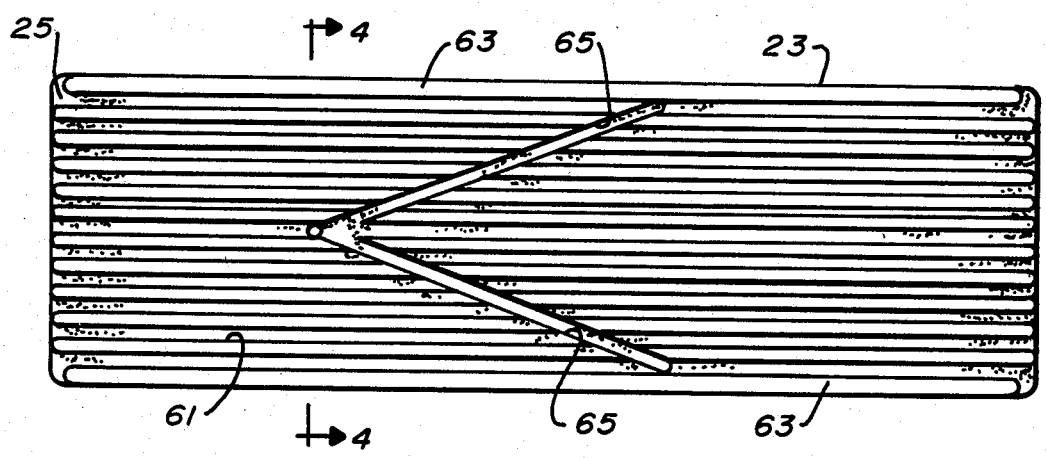

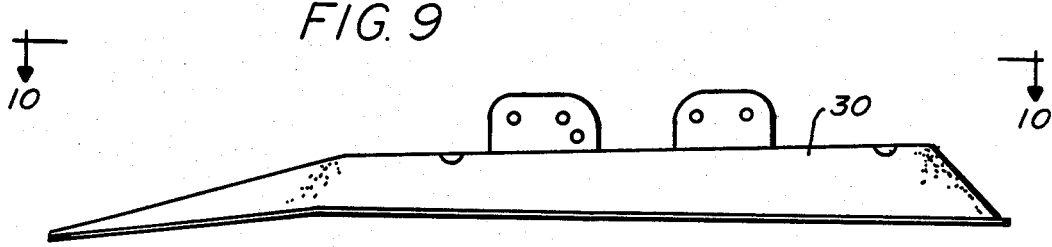
FIG. 9
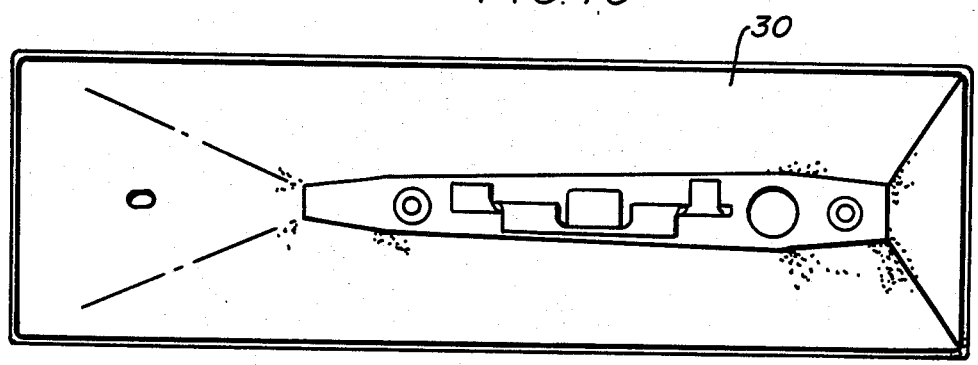
FIG. 10
FIG. 11
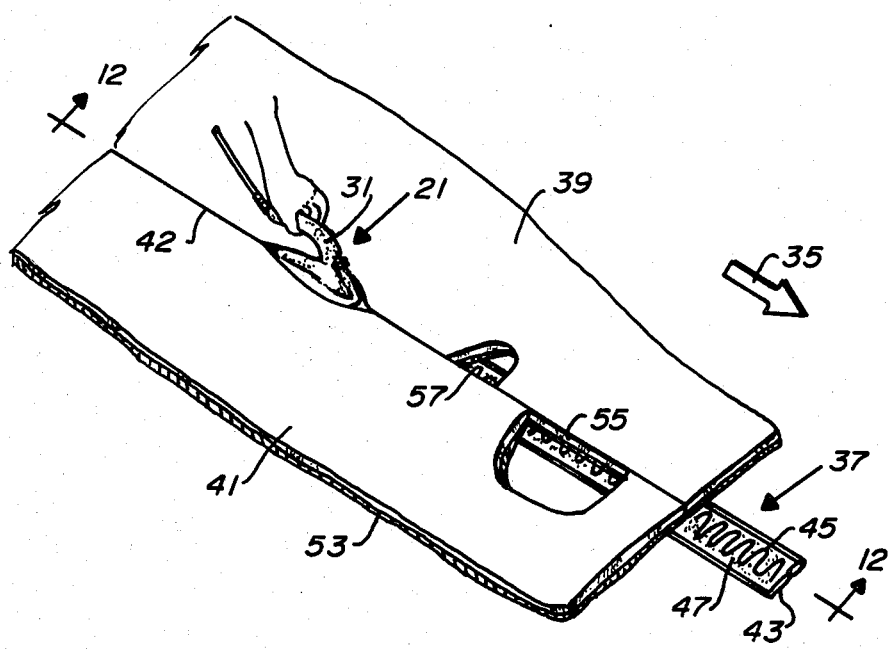

METHODS AND APPARATUS FOR LOCKING THE FACING EDGES OF CARPET BACKINGS DIRECTLY TOGETHER AT THE SEAM DURING A FACE SEAMING OPERATION WITH A HOT MELT ADHESIVE TAPE

BACKGROUND OF THE INVENTION

This invention relates to method and apparatus for face seaming carpet pieces with hot melt adhesive tapes.

This invention relates particularly to an iron which forms a raised center bead of adhesive in the molten hot melt adhesive produced at the outlet end of the iron. The raised center bead coats the side edges of the carpet backings with hot melt adhesive. These edges are locked directly together by the interposed hot melt adhesive after the adhesive cools to a solid condition.

For many years a hot melt adhesive carpet seaming tape and a face seaming process (with the hot melt adhesive activated by an iron placed on the tape and under the pieces of carpet to be joined) have been the most widely used tape and seaming methods for joining pieces of carpet.

While seams made this way are very good in a majority of the installations, a certain number of seams will peak and others will have flex failures.

Peaking results from the seam being elevated slightly when the carpet is stretched into place, making the whole seam visible from the top of the carpet.

Flex failures are a splitting of the tape directly under the line where the two pieces of carpet meet. Flex failures usually occur when very stiff carpet is applied over soft, thick underlayment. Flex failures are particularly likely to occur when bundles of glass fibers are used as the strength members for reinforcement of the tape. If the bundles of glass fibers are not sufficiently well encapsulated and held in place by the hot melt adhesive, the bundles can become exposed and the glass fibers can then cut one another; because glass fibers do not chafe well.

Another problem which has occurred in seams made by prior art hot melt adhesive tape face seaming techniques is raveling out of the tufts at the seam. This happens because the carpet pieces, when cut to make the seam, may permit some of the tufts immediately adjacent the cut to become loose enough to ravel out. When a carpet piece is cut, there can be a loss of locking of the strands in the carpet backing which are nearest the cut. The tufts or yarn can then strip out, because there is nothing to hold the yarn there. This raveling problem can still be present after the carpet has been seamed with the usual face seaming process, because the hot melt adhesive on the underside of the carpet backing does not replace the continuity of the uncut carpet backing on the cut edge. The conventional face seaming processes with hot melt adhesive are usually not effective to get adhesive up into the space between the edges of the carpet backing for locking the loose tufts in place.

Another problem which has been present in seams produced by prior art hot melt seaming techniques has been the problem of separation of the secondary backing from the primary backing. In some carpets the tufts are attached to a primary backing, and the primary backing is glued to a secondary backing. When pieces of carpet having such primary and secondary backings are cut (as part of making a seam), the primary backing can become separated from the secondary backing. Such separation can make the seam visible.

Carpet manufacturers have recommended putting latex along the edges of all cut carpet edges before hot melt face seaming, but virtually no layers use the procedure. The procedure requires considerable time. The time required to do the latex sealing is often longer than the time required to do a face seam itself. Also, latexing the carpet edges is a critical operation. If the latex is put in the wrong place, the hot melt adhesive will not bond to the latex.

SUMMARY OF THE PRESENT INVENTION

It is a primary object of the present invention to face seam with hot melt adhesive tapes using methods and apparatus which overcome the problems of the prior art.

It is another important object of the present invention to form a raised center bead of molten hot melt adhesive of sufficient height and stiffness to coat the side edges of the carpet backings.

It is another important object of the present invention to lock the side edges of the backings directly together at the seam through the hot melt adhesive coatings and the resulting layer of hot melt adhesive interposed between said side edges.

It is another object of the present invention to permit the use of a narrower and less expensive hot melt adhesive tape.

It is another object of the present invention to make seams which are consistently 25 to 50 percent stronger than those made by prior art irons and techniques.

It is another object of the present invention to eliminate the need to put latex along the cut edges of carpet backing before hot melt seaming the carpet pieces.

In the method of making a face seam in accordance with the present invention, the hot melt adhesive is heated to a molten condition and is simultaneously formed with a raised center bead. The raised center bead has sufficient height and stiffness to coat each of the side edges of the carpet backings with the molten hot melt adhesive. The coated side edges of the carpet backings are then locked directly together (through the thin layer of adhesive interposed between the side edges) as the hot melt adhesive cools to a solid condition.

In a specific embodiment of the present invention the raised center bead is formed by a carpet seaming iron. The iron has a rectangular baseplate with a longitudinally extending center groove. The center groove is dimensioned to produce a raised center bead of molten adhesive of the proper height and stiffness for the backing thickness of the carpet being seamed. With carpets having a conventional backing thickness of about one sixteenth (1/16) inch, the longitudinal groove in the baseplate of the iron of the present invention has a width of about one eighth (⅛) inch and a depth of about one eighth inch.

In one specific embodiment of the present invention the center groove extends the entire length of the baseplate. A chevron groove is associated with the longitudinal groove to collect molten hot melt adhesive and to funnel the collected adhesive into the longitudinal center groove. This insures an adequate supply of molten hot melt adhesive to the center groove.

A positive centering control is exerted on the iron as the iron is moved along the length of the seam. The centering control insures that the high, center bead of hot melt adhesive is positioned in the center of the carpet seam to keep the adhesive on the side edges of the carpet backings and to prevent the adhesive from flowing into the tuft area of the carpet. The centering control is produced by engaging a guide element on the top of the iron with the sides of the carpet pieces during substantially the entire time that the carpet pieces are lifted from the tape by the iron.

A heat shield cover extends over the entire top surface of the baseplate to prevent any direct contact between the hot baseplate and the undersides of the carpet backings.

The bead forming center groove of the present invention can be used with carpet seaming irons having a flat bottom surface and with carpet seaming irons having a ribbed bottom surface. The iron of the present invention is constructed to permit ready interchange of these two different kinds of baseplates.

The way in which the raised center bead coats the side edges of the carpet backings with hot melt adhesive during the course of the face seaming process causes the side edges of the backings to be locked directly together through the adhesive interposed between said side edges. This, in turn, produces seams which are consistently 25 to 50 percent stronger than those made by irons available in the prior art. The stress produced by stretching the carpet flows, in the seam produced by the present invention, directly from the backing on one piece of carpet to the backing of the other piece of carpet through the adhesive in the seam (instead of from one piece of carpet down into the tape and then back up into the other piece of carpet as occured in the prior art).

As a result, the carpet seaming tape, in seams made in accordance with the present invention, does not tend to line up with the stress line in the carpet. Because stress is transmitted directly through the edges of the carpet backings there is no displacement of the splice or "peaking" (gapping or opening of the seam).

The directly locked carpet backings in the seam produced by the present invention cause the whole seam assembly to move as a unit rather than permitting hinging or a relative movement of the seamed edges up and down past each other. As a result, joints made with the new iron can reduce the stress on glass fibers enough to prevent exposure and can produce seams that last five to six times longer in flex situations than seams made with prior art irons and techniques.

Because a significant amount of stress is transferred from one piece of carpet directly to the other piece of carpet through the adhesive between the locked together carpet backings (in the seam made by the present invention), the shear area between the carpet and the seaming tape on either side of the seam can be reduced markedly. With the present invention the shear area can be reduced 50 percent by reducing the width of adhesive 50 percent, and seams can still be produced by the present invention with strengths comparable to strengths made by prior art tapes having much larger adhesive widths.

The present invention therefore gives a significant economic benefit; because the adhesive cost is the single largest cost in the manufacture of tape, usually accounting for about 45 percent of the finished tape cost.

Another important benefit of the present invention is the fact that the adhesive interposed between the edges of the carpet backings locks the edge tufts in place so that they will not ravel out.

The layer of adhesive which locks the edges of the carpet backings together as a result of the method and apparatus of the present invention also locks secondary backings to primary backings. This prevents primary backings from lifting away from the secondary backings and thereby prevents making the seams visible.

Center bead forming face seaming methods and apparatus as described above and effective to function as described above constitute additional, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a side elevation view of a carpet seaming iron constructed in accordance with one embodiment of the present invention.

FIG. 2 is a top plan view, taken along the line and in the direction indicated by the arrows 2—2 in FIG. 1, of the iron shown in FIG. 1.

FIG. 3 is a bottom plan view of one form of the iron shown in FIG. 1. FIG. 3 is taken along the line and in the direction indicated by the arrows 3—3 in FIG. 1. FIG. 3 shows an embodiment of the invention having a longitudinally ribbed surface for engaging the hot melt adhesive on the carpet seaming tape. Another embodiment of the present invention, not illustrated, has a flat, non-ribbed surface for engaging and heating the hot melt adhesive.

Figure 4:
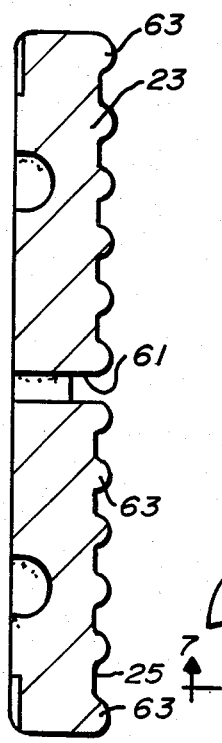

FIG. 4 is a cross section view, taken along the line and in the direction indicated by the arrows 4—4 in FIG. 3 showing details of construction of the platen or baseplate of the iron having the ribbed lower surface.

Figure 5:
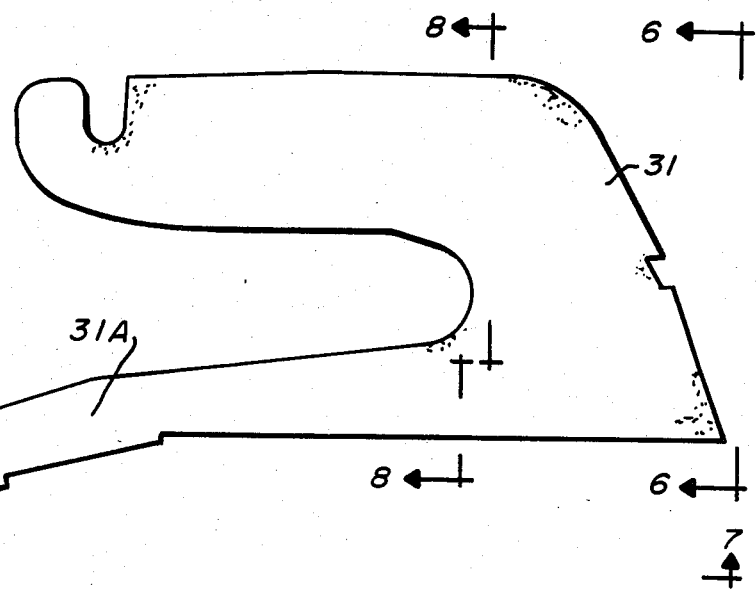

FIG. 5 is a side elevation view of just the handle for the iron shown in FIG. 1.

Figure 6:
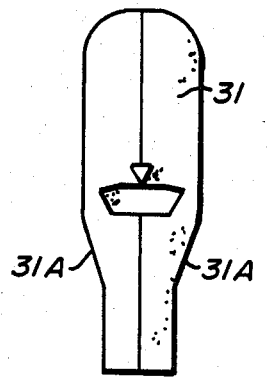

FIG. 6 is an end elevation view taken along the line and in the direction indicated by the arrows 6—6 in FIG. 5.

Figure 7:
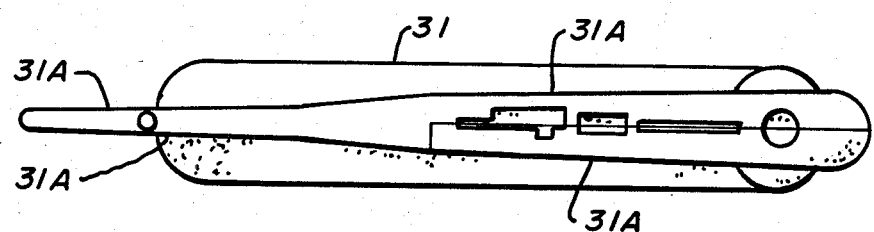

FIG. 7 is a bottom plan view taken along the line and in the direction indicated by the arrows 7—7 in FIG. 5.

Figure 8:
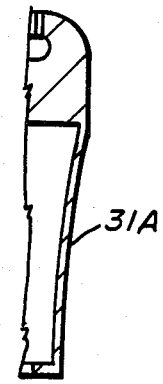

FIG. 8 is a fragmentary view in cross section taken along the offset line and in the direction indicated by the arrows 8—8 in FIG. 5.

FIG. 9 is a side elevation view of a heat shield cover incorporated in the iron shown in FIG. 1.

FIG. 10 is a top plan view taken along the line and in the direction indicated by the arrows 10—10 in FIG. 9.

FIG. 11 is an isometric view showing how the iron of the present invention is used by a carpet installer in making a face seam between two pieces of carpet.

Figure 12:
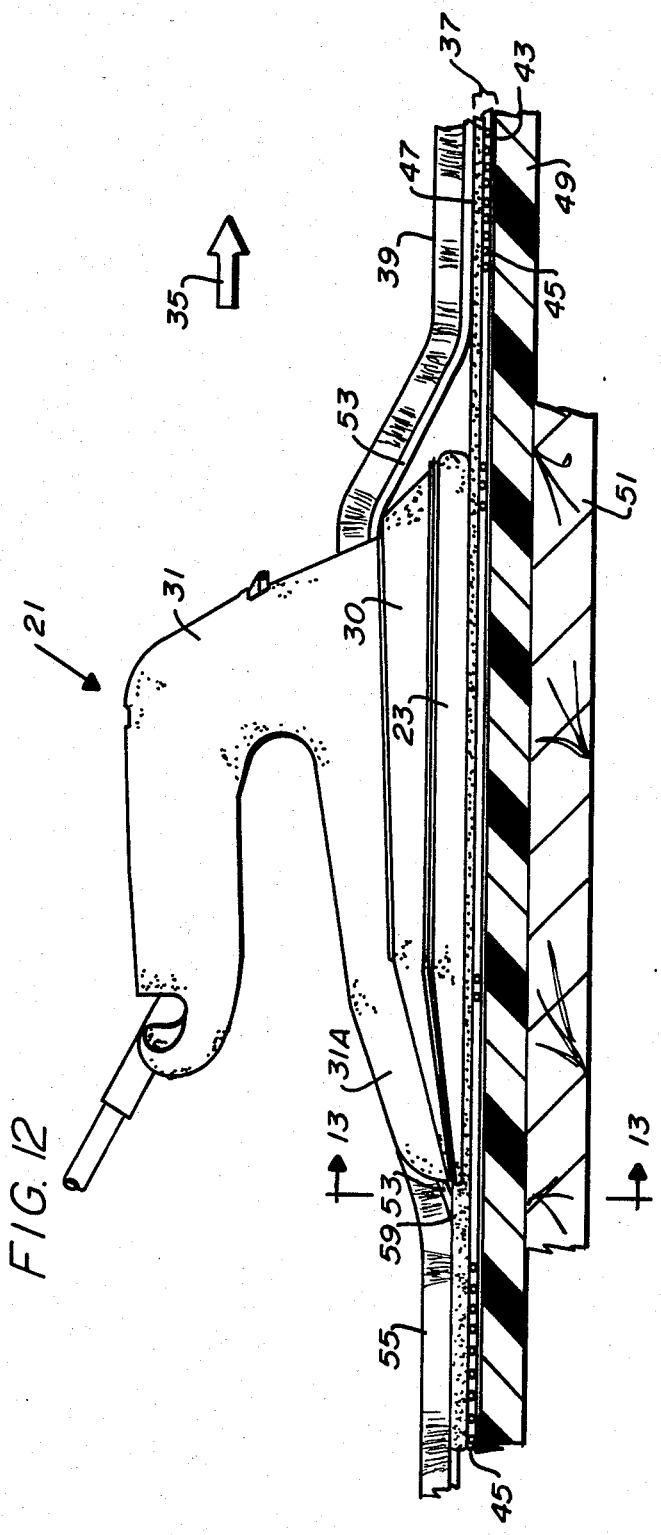

FIG. 12 is a side elevation view taken generally along the line and in the direction indicated by the arrows 12—12 in FIG. 11.

Figure 13:
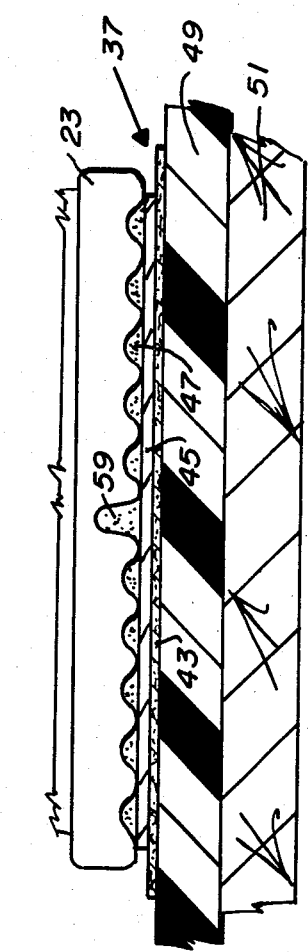

FIG. 13 is a cross section view through the tape at the outlet, back end of the iron and shows the raised center bead produced by the present invention.

DETAILED DESCRIPTION OF THE PREFERRED EMBODIMENTS

A carpet seaming iron constructed in accordance with one embodiment of the present invention is indicated by the general reference numeral 21 in FIGS. 1, 2, 3, 11 and 12.

As best illustrated in FIGS. 1-14, the iron 21 includes a platen or baseplate 23, a heat shield cover 30, a handle 31 and an integral guide 31A for engaging the carpet pieces and centering a raised bead of adhesive in the seams.

The baseplate 23 has a lower surface 25 (see FIGS. 3 and 4) which is engagable with the hot melt adhesive layer on the carpet seaming tape for heating the hot melt adhesive to a molten condition as the iron is moved along a tape 37 (see FIGS. 11 and 12) coated with a hot melt adhesive 47.

The platen or baseplate 23 is heated by an electrical heating unit 27 (shown in dashed outline in FIG. 1). The level of heat is controlled by an adjustable control dial 29, visible to the operator.

The handle 31 is removably attached to the heat shield 30 by screws 33 so that different baseplates can be used with the iron 21. The handle 31 permits an operator to hold the iron with his hand (in the manner illustrated in FIG. 11) and to move the iron (in the direction indicated by the block arrow 35 in FIGS. 3, 11 and 12) along the length of a carpet seaming tape 37 (see FIGS. 11 and 12) during a face seaming operation.

The handle 31 serves a dual function. It serves both as a handle and as a positive centering control for positioning a raised center bead 59 (see FIGS. 12 and 13) of molten adhesive in the center of the carpet seam, as will be described in more detail below.

The handle 31 is shown separately in FIGS. 5-8.

As illustrated in FIGS. 11 and 12, the carpet seaming tape 37 is a tape which is positioned beneath two pieces of carpet (carpet pieces 39 and 41 as illustrated in FIG. 11) to be joined along a seam 42.

The tape 37 used with the iron 21 of the present invention may be any one of a number of conventional hot melt adhesive carpet seaming tapes used for face seaming.

The tape 37 includes a paper backing 43, reinforcing strands 45 and a layer of hot melt adhesive 47.

As illustrated in FIGS. 11 and 12, the tape 37 is usually placed on top of a carpet underlay 49 which is in turn laid on a floor 51. The tape 37 has the layer of hot melt adhesive 45 facing upwardly.

As the iron 21 is moved along the tape (in the direction by the block arrow 35) the heat shield cover 30 lifts each piece of carpet from the tape at the front end of the iron, as illustrated in FIG. 12.

The heat shield cover 30 is shown by itself in FIGS. 9 and 10.

The heat shield cover 30 has an upper surface which is engagable with the undersides of the carpet backings for progressively lifting the backings from the tape at the front of the iron, as the iron is moved along the tape, and for then lowering the backings onto the layer of molten adhesive at the back of the iron. The heat shield cover 30 extends over the entire top of the platen or baseplate 23 so as to prevent direct contact between the hot baseplate and the carpet backings. This prevents excessive heating of the undersides of the carpet backings.

The upper surface of the heat shield cover 30 is shaped to raise the carpet pieces smoothly at the front of the iron and to lower the carpet pieces back downwardly, as the iron moves forwardly beneath the raised carpet pieces, smoothly and without buckling. The rearward part of the cover 30 also permits the facing edges of the carpet pieces to move smoothly toward and into engagement with one another at the back end of the iron as the iron is moved along the tape and between the pieces of carpet. The upper surface of the cover 30 lifts and then drops the pieces of carpet in a manner which tends to push the facing edges of the carpet into engagement with one another at the back end of the iron. This is important for obtaining a direct adhesive locking of the abutting edges of the carpet backings through a hot melt adhesive positioned upwardly and between these edges of the carpet backing at the rear of the iron, as will be described in more detail below.

The backing 53 for the carpet piece 39 has an edge 55 (see FIG. 11), and the backing 53 for the carpet piece 41 has an edge 57 (see FIG. 11).

It is a very important feature of the present invention that these edges 55 and 57 are locked directly together through a thin layer of hot melt adhesive. This thin layer of hot melt adhesive results from coatings of molten hot melt adhesive which are produced on the edges 55 and 57 by a raised center bead 59 of molten hot melt adhesive formed at the back, outlet end of the iron 21. This will be described in more detail below with specific reference to a grooved construction of the underside 25 of the baseplate 23.

The face seam is completed by engaging the adhesively coated side edges 55 and 57 of the carpet backings in contact with each other while engaging the undersides of the carpet backings with the layer of molten adhesive on the underlying tape. These engagements are continued until the molten hot melt adhesive cools to a solid condition. The side edges of the backing are then locked directly together through a thin layer of adhesive interposed between said side edges.

The direct edge locking adds considerable strength to the seam over the shear strength obtained just by the adhesion between the undersides of the carpet backing and tape.

The direct edge locking also produces many desirable characteristics in the completed seam (as compared to the characteristics of a seam which does not have the side edges of the backings locked directly together through a layer of adhesive positioned between said side edges).

The present invention provides methods and apparatus for forming a raised center bead 59 of molten hot melt adhesive having a sufficient height and a sufficient stiffness to coat each of the side edges 55 and 57 of the carpet backings with a coating of molten hot melt adhesive and to thereby cause the side edges of the backing to be locked directly together through the adhesive interposed between such side edges after the adhesive cools.

The method and apparatus of the present invention uses that raised center bead 59 of molten adhesive to coat the side edges 55 and 57 of the carpet backings with the molten adhesive from the raised center bead in the course of making the face seam.

As best illustrated in FIGS. 3 and 4, the iron 21 of the present invention has a longitudinally extending, center groove 61 formed in the lower surface 25 of the baseplate 23. The length, depth, width and alignment of this groove 61 is effective to form, in the layer of molten adhesive produced behind the moving iron, a raised center bead 59 of a sufficient height and of a sufficient stiffness to coat the side edges 55 and 57 (see FIG. 11) of the carpet backings 53 with hot melt adhesive as the undersides of the carpet backings are lowered onto the layer of molten adhesive produced behind the iron. This coating of the side edges 55 and 57 causes the side edges to be locked directly together through a thin layer of adhesive interposed between said side edges.

In a preferred embodiment of the present invention, the center groove 61 extends along the entire length of the baseplate as illustrated in FIG. 3.

The depth and width of the groove 61 is matched to the viscosity of hot melt adhesives presently in use and is matched also to the thickness of carpet backings presently in use. Many carpet backings presently in use have a thickness of about one-sixteenth (1/16) of an inch, and the center groove 61 has a depth of at least three-thirty seconds (3/32) for such carpet backings.

The depth and width of the center groove is also dependent to some extent to the type of baseplate used. With a ribbed type baseplate as illustrated in FIG. 4 in which the ribs 63 extend about 0.045 inch from the surface 25, good results have been obtained with center grooves having a width of substantially one eighth (⅛) inch and a depth within the range of three-thirty seconds inch (3/32) to one eighth inch. This depth is a depth measured from the surface 25 shown in FIG. 4.

With baseplates having a flat lower surface, the center groove produces good results when the groove has a width of substantially one eighth inch (⅛) and a depth of substantially one eighth inch.

In one embodiment of the present invention a chevron groove 65 is formed in the baseplate for collecting molten hot melt adhesive in the two legs of the chevron groove and for funneling the collected molten hot melt adhesive into the center groove 61 as the iron is moved in the direction indicated by the block arrow 35 in FIG. 3. This chevron groove insures an adequate supply of molten hot melt adhesive to the center groove during all conditions of operation. The two legs of the chevron groove 65 are preferably aligned at about a 20 degree angle with respect to the groove 61.

As illustrated in FIG. 3, the outer ends of the chevron groove do not extend through the outside ribs 63.

The raised center bead (indicated as the bead 59 in FIG. 12) is formed to have a height high enough to coat the edges 55 and 57 of the carpet backings 53 without flowing into the tufts 54 of the carpet pieces.

It is very important to exert a positive centering control effective to position the raised center bead 59 in the center of the carpet seams. Such centering control insures that the adhesive will stay on the side edges of the backings without getting up into the tuft area of the carpet.

The handle 31 of the present invention includes a lower guide portion 31A which engages the sides of the carpet pieces along substantially the full length of the iron to provide this positive centering control. The configuration of this guide portion 31A is best illustrated in FIGS. 5–8. As illustrated in these figures, the guide portion 31A tapers to a quite narrow thickness at the back end of the iron. The guiding is done by the total length of the guide member 31A and there is no edge on the guide portion 31A for the edges of the carpet back to guide on.

In summary, the present invention is effective to heat the holt melt adhesive to a molten condition and to simultaneously form a raised center bead of molten adhesive of sufficient height and stiffness to coat the side edges of the carpet backings with the molten hot melt adhesive. The raised center bead does coat the side edges of the carpet backings with the molten adhesive in the course of making the face seam. When the face seam is completed, the adhesively coated side edges of the carpet backings are locked directly together with each other through the thin layer of adhesive extending upwardly and between the abutting edges of the carpet backings. This adds significant strength to the seam because the strength of the seam is not dependent solely on the shear area between the carpet and the seaming tape on either side of the seam (that is, the shear area produced by the adhesive engagement of the undersides of the carpet pieces, through the hot melt adhesive, with the carpet seaming tape). This permits the shear area and the amount of adhesive required to be reduced significantly while still producing seams with strengths comparable to tapes having much larger adhesive widths. This in turn produces a significant reduction in tape costs, because the single largest cost item in the manufacture of the tape is the hot melt adhesive cost.

The direct locking of the edges of the carpet backing to one another through the interposed layer of hot melt adhesive also produces a number of significant functional benefits. Because the edges are locked directly to one another, peaking is virtually eliminated. This results because carpet seaming tape does not tend to line up with the stress line in the carpet, and there therefore is no displacement of the splice or "peaking".

Another benefit is obtained when glass fiber bundles are used as the strength members, because the direct locking of the edges of the carpet backing together prevents the formation of a gap in the seam during flexing. This prevention of flexing prevents exposure of the glass and prevents chafing of the fiber bundles which chafing can result if the fiber bundles are exposed and are permitted to cut against one another.

The raised center bead of adhesive is effective to lock the tufts of the carpet to the carpet backing. This in turn prevents raveling at the seam.

The direct locking of the edges of the carpet backings to one another also provides a highly desirable locking of primary and secondary backings when the carpet pieces are of the kind having primary and secondary backings. Locking primary and secondary backings together prevents making the seam visible.

While I have illustrated and described the preferred embodiments of my invention, it is to be understood that these are capable of variation and modification, and I therefore do not wish to be limited to the precise details set forth, but desire to avail myself of such changes and alternations as fall within the purview of the following claims.

We claim:

1. A carpet seaming iron of the kind used for making a face seam between two pieces of carpet by heating a layer of hot melt adhesive on a carpet seaming tape positioned beneath the carpet backings at the seam and extending along the length of the seam, said iron comprising, baseplate means having a lower surface engagable with the hot melt adhesive layer on the tape for heating the hot melt adhesive to a molten condition as the iron is moved along the tape, handle means for manually moving the iron along the tape and beneath the carpet backings at the seam, surface means on the upper surface of the iron and engagable with the undersides of the carpet backings for progressively lifting the backings from the tape at the front of the iron, as the iron is moved along the tape, and then lowering the backings onto the layer of molten adhesive at the back of the iron and, groove means formed in the lower surface of the baseplate means and including a longitudinally extending, center groove having a length, depth, width, and alignment effective to form, in the layer of molten adhesive produced behind the moving iron, a raised center bead of a sufficient height and stiffness to coat the side edges of the carpet backings with hot melt adhesive as the undersides of the carpet backings are lowered onto the layer of molten adhesive and to thereby cause said side edges of the backings to be locked directly together through the adhesive interposed between said side edges.

2. The invention defined in claim 1 wherein the upper surface means include heat shield means for preventing direct contact between the hot baseplate means and the carpet backings.

3. The invention defined in claim 2 wherein the heat shield means extend the full length of the iron upper surface to prevent excessive heating of the undersides of the carpet backings.

4. The invention defined in claim 1 wherein the baseplate means have a rectangular shaped lower surface and said center groove extends along the entire length of the baseplate.

5. The invention defined in claim 4 including chevron-groove means in the lower surface for collecting molten hot melt adhesive in the chevron groove means as the iron is moved along the tape and effective to funnel the collected molten hot melt adhesive into said center groove to insure an adequate supply of molten hot melt adhesive to the center groove during all conditions of operation.

6. The invention defined in claim 4 wherein the iron is used with carpet backings having a thickness of about one-sixteenth inch and the center groove has a depth of at least three-thirty seconds inch.

7. The invention defined in claim 6 wherein the lower surface of the baseplate means is a ribbed surface having a number of ribs projecting from the lower surface and extending parallel to said center groove and wherein the ribs have a height of about 0.045 inch.

8. The invention defined in claim 6 wherein the center groove has a width of substantially one-eighth inch and a depth of substantially one-eighth inch measured from the lower surface of the iron immediately adjacent the sides of the center groove.

9. The invention defined in claim 8 wherein the lower surface of the baseplate means is a flat surface.

10. The invention defined in claim 1 wherein the carpet seaming tape is of the kind having glass fiber bundles as the strength members and wherein said center groove of the iron produces a thin thickness of adhesive right in the seam between the carpet-backings and which maintains encapsulation of the glass fiber bundles at the seam (by preventing the formation of a gap in the seam during flexing of the seam) and thereby prevents exposure of the glass and chafing of the fiber bundles at the seam.

11. The invention defined in claim 1 wherein the height of the raised center bead is matched to the thickness of the carpet backings to produce locking of the tufts in place to prevent raveling at the seam.

12. The invention defined in claim 11 wherein the height of the raised center bead is limited to a height which does not produce flow of adhesive into the tufts.

13. The invention defined in claim 1 wherein the carpet is of the kind having a primary and a secondary backing and wherein the height of the center bead is matched to the thickness of the primary and secondary backings so as to produce locking of the secondary backing to the primary backing at the seam which prevents making the seam visible.

14. The invention defined in claim 1 including positive centering control means on the iron for positioning the raised center bead of adhesive in the center of the carpet seam so that the adhesive will stay on the side edges of the backings without getting up into the tuft area of the carpet.

15. The invention defined in claim 14 wherein the positive centering control means include a longitudinally elongated guide on the upper surface of the iron which engages the sides of the carpet pieces along substantially the full length of the iron.

16. The invention defined in claim 15 wherein the guide is an integral part of the handle means.

17. A method of making a face seam between two pieces of carpet by heating a layer of hot melt adhesive on a carpet seaming tape which is positioned beneath the carpet backings at the seam and which extends along the length of the seam, said method comprising, heating the hot melt adhesive to a molten condition, simultaneously forming a raised center bead of molten adhesive of sufficient height and stiffness to coat the side edges of the carpet backings with the molten hot melt adhesive, coating the side edges of the carpet backings with the molten adhesive from the raised center bead, and completing the face seam by engaging the adhesively coated side edges of the carpet backings in contact with each other while engaging the undersides of the carpet backings with the layer of molten adhesive on the underlying tape and maintaining the engagement until the molten hot melt adhesive cools to a solid condition to thereby cause the side edges of the backings to be locked directly together through the adhesive interposed between said side edges.

18. The invention defined in claim 17 including forming the raised center bead by a carpet seaming iron having a baseplate with a longitudinal center groove dimensioned to produce a raised center bead of molten adhesive of the proper height and stiffness for the thickness of the backings of the carpet being seamed.

19. The invention defined in claim 18 including preventing direct contact between the hot part of the iron and the lifted portions of the carpet pieces by a heat shield which engages the undersides of the carpet pieces and which extends the full length of the iron.

20. The invention defined in claim 18 including locking the tufts of the carpet to the carpet backing by the adhesive formed in the seam and positioned between the edges of the backings to prevent raveling at the seam.

21. The invention defined in claim 18 including feeding the center groove of the iron with molten hot melt adhesive collected by a chevron groove construction formed in the lower surface of the iron to insure an adequate supply of molten hot melt adhesive to the center groove.

22. The invention defined in claim 18 including progressively lifting the undersides of the carpet pieces from the tape as the iron is moved along the length of the tape to heat the adhesive and then lowering the undersides of the carpet pieces back onto the layer of molten adhesive and at the same time pushing the edges of the carpet pieces together and against the raised bead of hot melt adhesive at the seam.

23. The invention defined in claim 22 including exerting a positive centering control on the iron as the iron is moved along the length of the seam to insure that the high, center bead of hot melt adhesive is positioned in the center of the carpet seam to keep the adhesive on the side edges of the carpet backings and to prevent the adhesive from flowing into the tuft area of the carpet.

24. The invention defined in claim 23 wherein the centering control is produced by engaging a guide element on the top of the iron with the sides of the carpet pieces during substantially the entire time that the carpet pieces are lifted from the tape by the iron.

25. The invention defined in claim 17 wherein the tape is of the kind having glass fiber bundles as the strength members and including encapsulating the glass fiber bundles at the seam by hot melt adhesive which includes the hot melt adhesive which extends upwardly into the seam and which prevents the formation of a gap in the seam during flexing to thereby prevent exposure of the glass and chafing of the fiber bundles at the seam.

26. The invention defined in claim 17 wherein the carpet is of the kind having a primary backing and a secondary backing and including locking the secondary backing to the primary backing by the bead of adhesive produced in the seam between the edges of the carpet pieces.

* * * * *